(12) United States Patent
Wu et al.

(10) Patent No.: US 11,743,025 B1
(45) Date of Patent: Aug. 29, 2023

(54) OPTICAL SENSOR DEVICES AND METHOD CAPABLE OF CALIBRATING CLOCK SIGNAL BY ITSELF WHEN RECEIVING ONE OR MORE TRANSMISSIONS OF SPECIFIC COMMUNICATION SIGNAL FROM MONITORING SYSTEM

(71) Applicant: PixArt Imaging Inc., Hsin-Chu (TW)

(72) Inventors: Chih-Huan Wu, Hsin-Chu (TW);
Wen-Han Yao, Hsin-Chu (TW);
Ren-Hau Gu, Hsin-Chu (TW)

(73) Assignee: PixArt Imaging Inc., Hsin-Chu (TW)

( * ) Notice: Subject to any disclaimer, the term of this patent is extended or adjusted under 35 U.S.C. 154(b) by 22 days.

(21) Appl. No.: 17/695,803

(22) Filed: Mar. 15, 2022

(51) Int. Cl.
*H04L 7/00* (2006.01)
*H04L 67/12* (2022.01)
*H04L 67/141* (2022.01)

(52) U.S. Cl.
CPC ............ *H04L 7/0075* (2013.01); *H04L 67/12* (2013.01); *H04L 67/141* (2013.01)

(58) Field of Classification Search
CPC ...... H04L 7/0075; H04L 67/12; H04L 67/141
USPC ........................................................ 709/224
See application file for complete search history.

(56) References Cited

U.S. PATENT DOCUMENTS

| 2002/0152044 | A1* | 10/2002 | Shanks ............ G06K 19/07767 340/870.26 |
| 2008/0192711 | A1* | 8/2008 | Balachandran ... H04W 28/0284 370/338 |
| 2010/0198992 | A1* | 8/2010 | Morrison ............. G10H 1/0058 709/248 |
| 2014/0044096 | A1* | 2/2014 | Heinrich ............... H04J 3/0688 370/328 |
| 2017/0324537 | A1* | 11/2017 | Liaghati ................... H04Q 9/00 |

FOREIGN PATENT DOCUMENTS

| JP | 2004020218 | A  | * | 1/2004 | ............... G04C 9/02 |
| JP | 4204341 | B2 | * | 1/2009 | ............. H04N 1/053 |
| JP | 4521800 | B2 | * | 8/2010 | ......... G06K 15/1219 |

* cited by examiner

*Primary Examiner* — Ruolei Zong
(74) *Attorney, Agent, or Firm* — Winston Hsu

(57) ABSTRACT

A method of an optical sensor device includes: using an oscillator circuit to generate a clock signal; and generating monitoring frames according to the clock signal; wherein the clock signal is calibrated in response to at least one of: a first communication signal, transmitted for multiple times from a monitoring system externally coupled to the optical sensor device, is received by the optical sensor device; a data length of the first communication signal transmitted for only one time from the monitoring system externally coupled to the optical sensor device; and, a data length of an encoded data portion of the first communication signal transmitted for only one time.

20 Claims, 5 Drawing Sheets

OPTICAL SENSOR DEVICES AND METHOD CAPABLE OF CALIBRATING CLOCK SIGNAL BY ITSELF WHEN RECEIVING ONE OR MORE TRANSMISSIONS OF SPECIFIC COMMUNICATION SIGNAL FROM MONITORING SYSTEM

BACKGROUND OF THE INVENTION

1. Field of the Invention

The invention relates to an optical sensing mechanism, and more particularly to an optical sensor device and a method.

2. Description of the Prior Art

Generally speaking, a conventional optical sensor device's clock frequency may have a significant deviation caused by temperature or pressure variations. The accuracy of the clock generator in the conventional optical sensor device will be more easily affected if the clock generator is implemented by using a low power or low-cost oscillator. For example, the significant frequency deviation may be 20 percent. This significant frequency deviation also affects other operations such as frame timings, image processing operations, timings of auto exposure operation, time of flight operation, and so on.

SUMMARY OF THE INVENTION

Therefore one of the objectives of the invention is to provide an optical sensor device and a method to solve the above-mentioned problems.

According to embodiments of the invention, an optical sensor device is disclosed. The optical sensor device comprises an oscillator circuit and a processor. The oscillator circuit is used for generating a clock signal. The processor is coupled to the oscillator circuit, and it is used for generating monitoring frames according to the clock signal, The clock signal is calibrated in response to at least one of: a first communication signal, transmitted for multiple times from a monitoring system externally coupled to the optical sensor device, is received by the optical sensor device; a data length of the first communication signal transmitted for only one time from the monitoring system externally coupled to the optical sensor device; and, a data length of an encoded data portion of the first communication signal transmitted for only one time.

According to the embodiments, an optical sensor device is further disclosed. The clock signal can be adjusted using different modes based on a network traffic condition of a communication protocol between the optical sensor device and a monitoring system externally coupled to the optical sensor device.

According to the embodiments, a method of an optical sensor device is disclosed. The method comprises: using an oscillator circuit to generate a clock signal; and generating monitoring frames according to the clock signal; wherein the clock signal is calibrated in response to at least one of: a first communication signal, transmitted for multiple times from a monitoring system externally coupled to the optical sensor device, is received by the optical sensor device; a data length of the first communication signal transmitted for only one time from the monitoring system externally coupled to the optical sensor device; and, a data length of an encoded data portion of the first communication signal transmitted for only one time.

These and other objectives of the present invention will no doubt become obvious to those of ordinary skill in the art after reading the following detailed description of the preferred embodiment that is illustrated in the various figures and drawings.

DETAILED DESCRIPTION

The invention aims at providing a technical solution of an optical sensor device and a corresponding method capable of dynamically determining whether to calibrate and how to calibrate an actual frequency of a clock signal generated by an oscillator comprised within the optical sensor device by using the optical sensor device itself to count at least one of the following parameters: a time interval between two or more transmissions of a specific communication signal transmitted from a monitoring system to the optical sensor device; a total transmission number of the specific communication signal transmitted by the monitoring system (i.e. a total reception number of the specific communication signal received by the optical sensor device); a data length or packet length (e.g. payload sequence) of a single one signal reception of the specific/negotiated communication signal received by the optical sensor device; and, an encoded data content length of a single one signal reception of the specific communication signal.

The provided optical sensor device can be arranged to count the time length between two or more negotiated communication signals or count the data/time length of one negotiated communication signal so as to determine whether to and how to calibrate or adjust the clock signal. It is not required for a monitoring system to notify the provided optical sensor device of how to calibrate the clock signal, and the implementation of the monitoring system can become comparatively simple; thus, the provided optical sensor device can be suitable for any kinds of monitoring systems. The corresponding operations are detailed in the following paragraphs.

Figure 1:
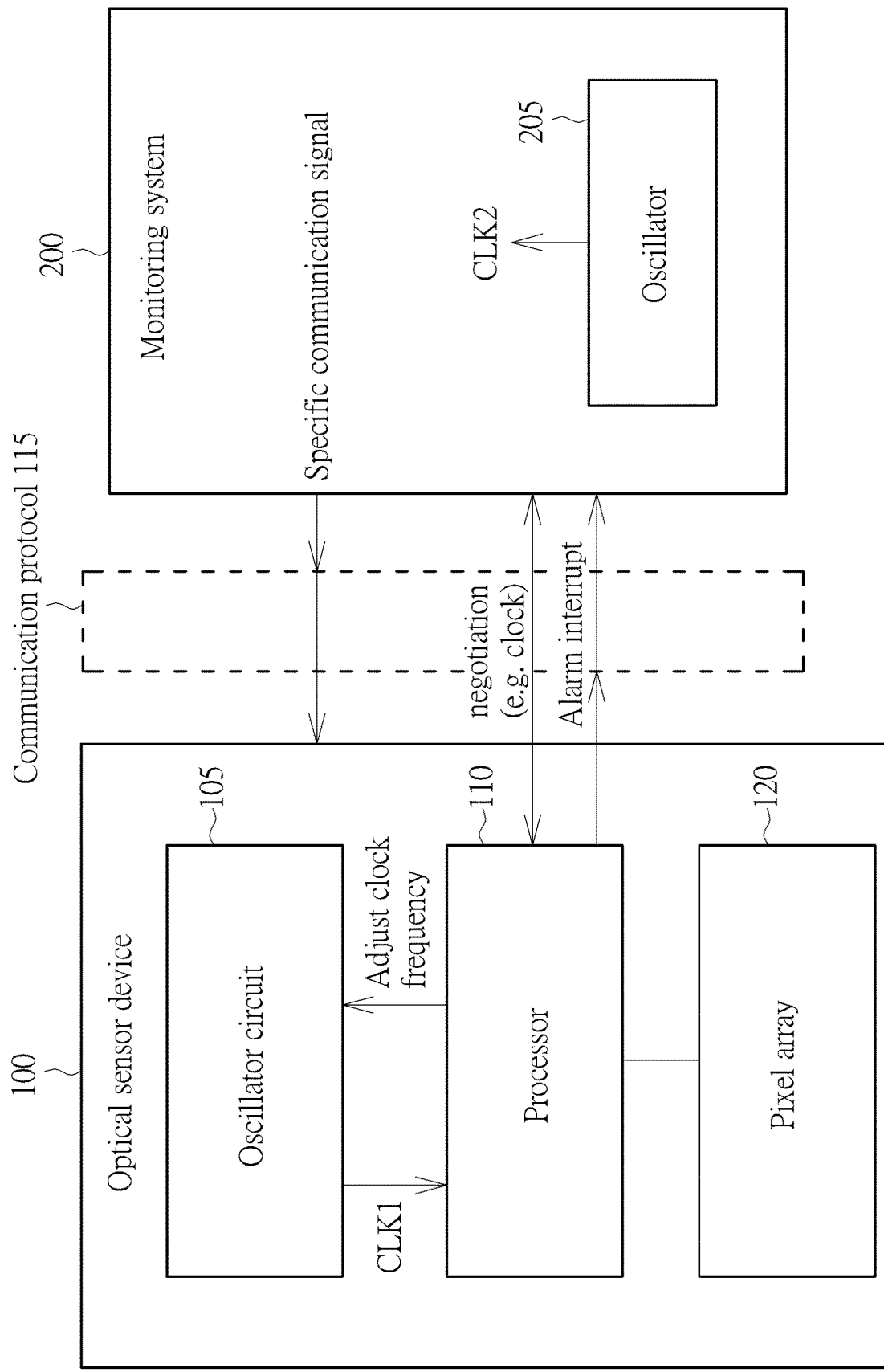
FIG. 1 is a block diagram of an optical sensor device according to an embodiment of the invention.

FIG. 1 is a block diagram of an optical sensor device 100 according to an embodiment of the invention. The optical sensor device 100 for example is used as a motion detection device or a security camera device, and it comprises an oscillator circuit 105, a processor 110, and other circuit component(s) such as the sensor device's pixel array 120 having multiple pixel units; the operation of the pixel array 120 is not detailed here for brevity and is not shown in FIG. 1. The optical sensor device 100 can be arranged to capture image(s), generate monitoring image(s)/frame(s) based on the capture image(s), determine whether a motion event occurs in the generated monitoring image(s), and to generate and output an alarm interrupt signal to the monitoring system 200 through the communication protocol 115 if it detects a motion event occurring in the generated monitoring image(s). The alarm interrupt signal is outputted to the monitoring system 200 only when the motion event is detected.

The monitoring system 200 is externally coupled to the optical sensor device 100, and it for example is a backend monitoring system which at least comprises two modes including a power saving mode (e.g. a sleep mode) and a normal operation mode. When no motion events are detected by the optical sensor device 100, the monitoring system 200 stays in the power saving mode to save power.

Once a motion event is detected by the optical sensor device 100, the optical sensor device 100 sends the alarm interrupt signal to wake up the monitoring system 200, and then the monitoring system 200 exits the power saving mode and enters the normal operation mode. In this situation, the monitoring system 200 is arranged to receive the alarm interrupt signal sent from the optical sensor device 100 and then to transmit an acknowledgement (ACK) signal back to the optical sensor device 100 through the communication protocol 115 so as to notify the optical sensor device 100 of that the monitoring system 200 enters the normal operation mode.

Then, after the optical sensor device 100 receives the ACK signal, the optical sensor device 100 can be arranged to transmit the monitoring image(s)/frame(s) to the monitoring system 200, and the monitoring system 200 can start a video recording operation to record and store the monitoring image(s)/frame(s) associated with the detected motion event for users; the corresponding operation is not detailed for brevity.

In addition, the optical sensor device 100 can communicate with the monitoring system 200 through the communication protocol 115 which can be a wired communication protocol or a wireless communication protocol. For example (but not limited), after the optical sensor device 100 used as the security camera is settled and powered up, the monitoring system 200 can negotiate with the optical sensor device 100, e.g. sending information, associated with the operating frequency, clock frequency, and/or a clock period used by the monitoring system 200, from the monitoring system 200 to the optical sensor device 100. Then, after receiving such information, the monitoring system 200 can notify the optical sensor device 100 of successful reception information.

For the optical sensor device 100, in practice, to reduce the circuit costs, the oscillator circuit 105 for example (but not limited) maybe implemented by using a low power oscillator (LPO) which consumes less/lower power and cheaper. The oscillator circuit 105 can be used for generating a clock signal CLK1 having a specific oscillation frequency into the processor 110.

The processor 110 is coupled to the oscillator circuit 105, and is arranged for controlling the pixel array 120 to capture image(s) to generate captured image(s) according to the specific oscillation frequency of the clock signal CLK1 generated from oscillator circuit 105, generating monitoring image(s)/frame(s) based on the capture image(s), determining whether a motion event occurs in the generated monitoring image(s), and for generating and outputting the alarm interrupt signal to the monitoring system 200 through the communication protocol 115 if detecting a motion event occurring in the generated monitoring image(s). For example (but not limited), one or more captured images may be temporal differential images such as differences of images of one pixel or may be spatial differential images such as pixel differences between neighboring pixels.

For the monitoring system 200, it comprises another oscillator 205 which can be implemented by using more complicated hardware circuit components. For example, the monitoring system 200 may be used to display a recorded video of a detected motion event for the user and can be supplied with more power. In addition, the oscillator 205 can provide a comparatively precise/accurate clock signal CLK2 having a comparatively precise/accurate oscillation frequency. The monitoring system 200 operates at the comparatively precise/accurate oscillation frequency of clock signal CLK2. It should be noted that equivalently the clock signal CLK2 for example is more precise than the clock signal CLK1 or may be more tolerable than the clock signal CLK1 for variation(s) such as temperature variations, process variations, or pressure variations. That is, for the clock signal CLK1, the clock signal CLK2 can be regarded as a precise clock signal.

In this embodiment, the clock signal CLK1 can be calibrated by the optical sensor device 100 itself in response to an event that a negotiated communication signal such as a specific communication signal that is transmitted for multiple times from the monitoring system 200 to the optical sensor device 100. The specific communication signal can be transmitted from the monitoring system 200 to the optical sensor device 100 through the communication protocol 115 for multiple times, and the multiple signal transmissions can be sent according to a specific time cycle period.

In one embodiment, the specific communication signal may be the above-mentioned acknowledgement signal which is used to notify the optical sensor device 100 of that the monitoring system 200 enters or is in the normal operation mode. The monitoring system 200 can be arranged to send such acknowledgement signal for two or more times at the specific time cycle period. That is, any two successive transmissions of such acknowledgement signal (i.e. the specific communication signal) is separated or spaced by a time interval which is equal to the specific time cycle period.

The monitoring system 200 operates at the comparatively precise/accurate clock signal CLK2, and thus the specific time cycle period used by the monitoring system 200 is also comparatively precise/accurate. It is assumed that the communication between the optical sensor device 100 and the monitoring system 200 is stable (i.e. no rapid and significant changes occur in the communication protocol 115), and the time interval between two transmissions of the monitoring system 200, i.e. the specific time cycle period, is substantially equal or equivalent to a time interval between the signal receptions of the two transmissions received by the optical sensor device 100. The processor 110 can determine whether to calibrate or tune the oscillation frequency of clock signal CLK1 based on the comparatively precise/accurate specific time cycle period after receiving the multiple transmissions of the specific communication signal from the monitoring system 200.

For example (but not limited), a counter reference value $CNTR_1$ employed by the processor 110 may be determined by using the following equation:

$$CNTR_1 \times \frac{1}{f_1} = CNTR_2 \times \frac{1}{f_2}$$

wherein $f_1$ indicates the target/rated oscillation frequency of clock signal CLK1, $f_2$ indicates the target/rated oscillation frequency of clock signal CLK2 used by the monitoring system 200, $CNTR_2$ indicates a target counted number generated by using the target oscillation frequency $f_2$ of clock signal CLK2 to count the specific time cycle period (i.e. the time interval between two adjacent/successive transmissions of the specific communication signal transmitted by the monitoring system 200), and $CNTR_1$ indicates the counter reference value (i.e. target counted number) calculated and employed by the processor 110 based on the above-mentioned parameters $f_1$, $f_2$, and $CNTR_2$; that is, using a higher frequency to count during a substantially identical (or merely slightly different) time period will generate a larger counted number. The processor 110 can calculate the counter reference value $CNTR_1$ as indicated by the following equation:

$$CNTR_1 = CNTR_2 \times \frac{f_1}{f_2}$$

Figure 2:
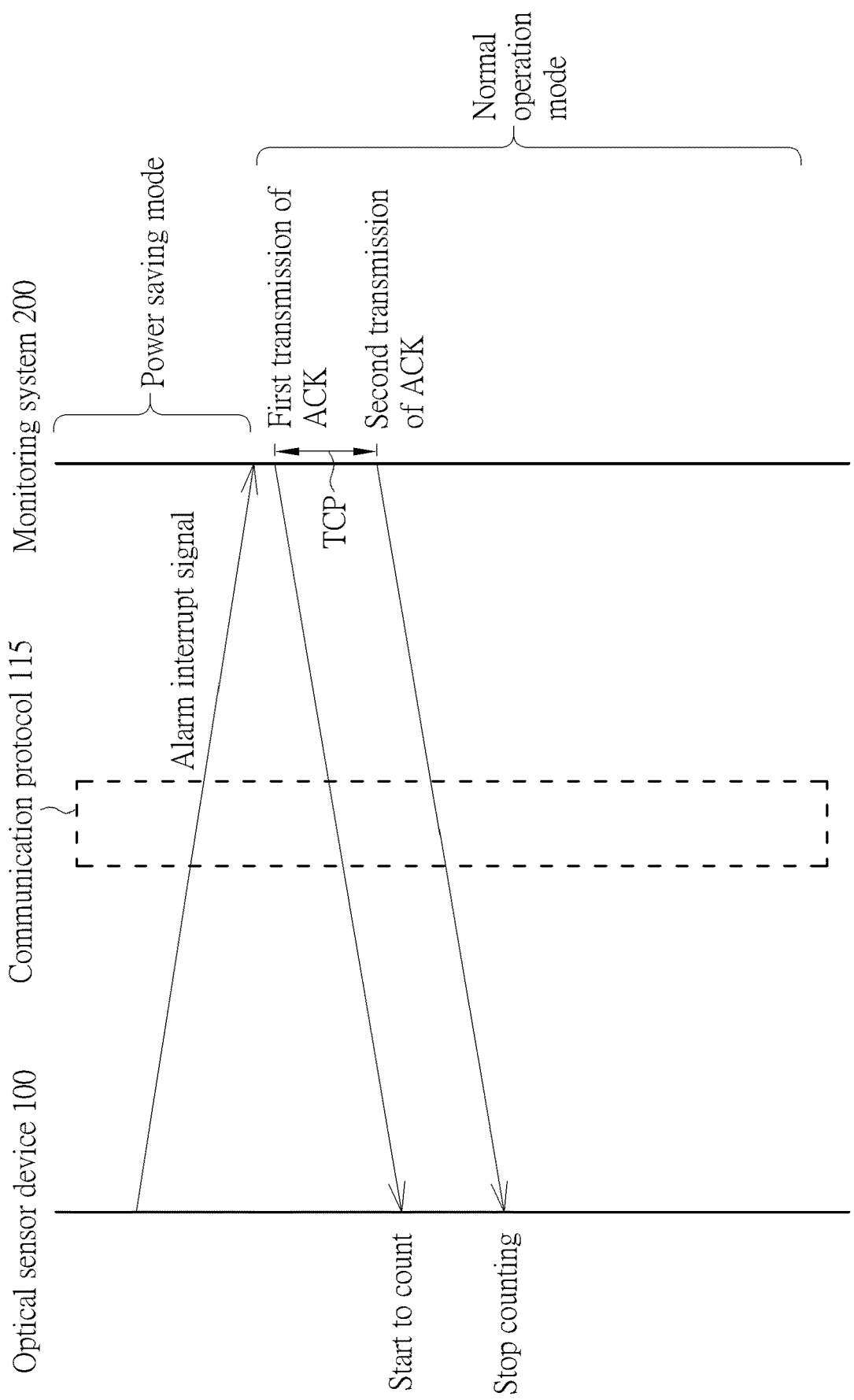
FIG. 2 is a diagram showing a scenario example of the communication between the monitoring system and the optical sensor device according to an embodiment of the invention.

FIG. 2 is a diagram showing a scenario example of the communication between the monitoring system 200 and the optical sensor device 100 according to an embodiment of the invention. In FIG. 2, the monitoring system 200 initially is in the power saving mode, and it exits the power saving mode and enters the normal operation mode once receiving the alarm interrupt signal sent from the optical sensor device 100. In this example, the monitoring system 200 then is arranged to send the specific communication signal (i.e. acknowledgement (ACK) signal) for two times back to the optical sensor device 100, and the two transmission of the ACK signal, separated by the specific time cycle period TCP, can be used to notify the optical sensor device 100 of that the monitoring system 200 is in the normal operation mode.

A first transmission of the ACK signal and a second transmission of the ACK signal is spaced by a time length of the specific time cycle period TCP. In practice, in FIG. 2, when the first transmission of the ACK signal arrives at the optical sensor device 100, the optical sensor device 100 is arranged to receive the first transmission and is also arranged to start a specific counter to count a counted number by using the actual oscillation frequency $f_{actual}$ of clock signal CLK1. For example, the counted number is incremented by one each time when a signal edge (rising edge or falling edge) of the clock signal CLK1 occurs. The specific counter is stopped when the second transmission of the ACK signal arrives at the optical sensor device 100. When the second transmission of the ACK signal arrives at the optical sensor device 100, the processor 110 is arranged to stop the counting of the specific counter and obtain a resultant counted number.

The processor 110 then compares the resultant counted number with the counter reference value $CNTR_1$ to determine whether to adjust/tune the clock signal CLK1 and determine how to adjust/tune the clock signal CLK1. For example, if the resultant counted number is smaller than a lower tolerable threshold of the counter reference value $CNTR_1$, then the processor 110 can determine that a frequency deviation/offset occurs in the clock signal CLK1 and the clock signal CLK1 becomes slower. In this situation, the processor 110 can trigger the oscillator circuit 105 running fast to increase the oscillation frequency $f_{actual}$ of clock signal CLK1 step by step so as to make a next counted number become larger than the lower tolerable threshold.

Instead, if the resultant counted number is larger than an upper tolerable threshold of the counter reference value $CNTR_1$, then the processor 110 can determine that another frequency deviation/offset occurs in the clock signal CLK1 and the clock signal CLK1 becomes faster. In this situation, the processor 110 can trigger the oscillator circuit 105 running slowly to decrease the oscillation frequency $f_{actual}$ of clock signal CLK1 step by step so as to make a next counted number become smaller than the upper tolerable threshold. If the resultant counted number is between the upper tolerable threshold and lower tolerable threshold, then the processor 110 can determine that the clock signal CLK1 is still accurate and it is not needed to calibrate the clock signal CLK1 at this timing.

In other embodiments, after obtaining the resultant counted number, the processor 110 can calculate or estimate the actual oscillation frequency $f_{actual}$ of clock signal CLK1 based on the resultant counted number and the above-mentioned parameters $f_1$ and $CNTR_1$:

$$f_{actual} = f_1 \times \frac{CNTR_{res}}{CNTR_1}$$

wherein $f_{actual}$ indicates the actual oscillation frequency of clock signal CLK1 which may be calibrated by the processor 110, and $CNTR_{res}$ indicates the obtained number/value of the resultant counted number. Then, the processor 110 can calculate the frequency deviation between the actual oscillation frequency $f_{actual}$ and the target oscillation frequency $f_1$ and can be arranged to determine whether to adjustor tune the actual oscillation frequency $f_{actual}$ of clock signal CLK1 based on the user's requirements. For example, the processor 110 can control the oscillator circuit 105 trying to use different frequency levels so as to find a frequency level which has a comparatively smaller frequency difference compared to the target oscillation frequency $f_1$.

In one embodiment, the specific time cycle period TCP may be configured as the clock period corresponding to the target oscillation frequency $f_2$ of the clock signal CLK2 in the monitoring system 200. In this example, the value $CNTR_2$ is configured as one, and the optical sensor device 100 can calculate the counter reference value $$CNTR_1 = \frac{f_1}{f_2}$$

by merely based on the target frequencies $f_1$ and $f_2$, wherein the target frequency $f_2$ for example may be sent from the monitoring system 200 to the optical sensor device 100 when the optical sensor device 100 is powered up. That is, it is not required for the monitoring system 200 to further send the value $CNTR_2$. Further, in other embodiment, the user may manually configure the parameter value of the target frequency $f_2$ for the setting of the optical sensor device 100, and thus a corresponding negotiation between the system 200 and device 100 is not needed. That is, in this situation, it is not necessary for the monitoring system 200 to send information of the target frequency $f_2$ to the optical sensor device 100 when the optical sensor device 100 is powered up. This effectively achieves that the optical sensor device 100 can dynamically calibrate its clock signal's CLK1 frequency by referring to only the target frequency $f_2$ of the monitoring system 200.

In one embodiment, the processor 110 maybe arranged to perform an image calibration operation such as a de-flicker operation to compensate the flickers occurring in the images. The image calibration operation's parameter(s) can be adjusted based on the calculated frequency deviation between the actual oscillation frequency $f_{actual}$ and the target oscillation frequency $f_1$. For example (but not limited), a parameter employed by the image calibration operation may be configured to be proportional or inversely proportional to the calculated frequency deviation.

Alternatively, in one embodiment, the processor 110 may be arranged to perform a specific processing operation which may comprises a specific information value which will be affected by the above-mentioned frequency deviation. In this embodiment, the processor 110 can use the calculated frequency deviation between the actual oscillation frequency $f_{actual}$ and the target oscillation frequency $f_1$ to calibrate the specific information value. For example, a default value of a de-flicker operation may be equal to $$\frac{1}{N}$$

which may be changed to $$\frac{1}{N'}$$

if a frequency deviation occurs, and the processor 110 can calibrate the value $$\frac{1}{N'}$$

into the default value $$\frac{1}{N}$$

It should be noted that the specific processing operation is not limited to the de-flicker operation and it may be associated with other kinds of operations such as a time-of-flight (TOF) calculation operation, a heart rate calculation operation, an auto exposure operation, and so on.

Further, in one embodiment, the counter reference value $CNTR_1$ may be a default value or a predetermined value, and it is not required for the optical sensor device 100 to negotiate with the monitoring system 200 for obtaining information to calculate the counter reference value $CNTR_1$. If the counter reference value $CNTR_1$ is not configured, then the optical sensor device 100 is arranged to negotiate with the monitoring system 200 to determine the counter reference value $CNTR_1$. For example, the above-mentioned parameters $f_2$ and $CNTR_2$ (or the specific time cycle period TCP) can be transmitted from the monitoring system 200 to the optical sensor device 100 after the negotiation.

An advantage of using the ACK signal as the specific communication signal and sending the ACK signal for multiple times is that it becomes simple for the monitoring system 200 to send the ACK signal for two or more times when the monitoring system 200 exits the power saving mode. It is not required implement additional circuit components and additional complicated algorithms into the monitoring system 200. In addition, another advantage is that the processor 110 can be arranged to timely calibrate the frequency of clock signal CLK1 after receiving the ACK signal corresponding to the image flicker or the false motion event for multiple times if the image flicker or a false motion event is caused by a frequency deviation of the clock signal CLK1. In one scenario example (but not limited), if a frequency offset, caused by temperature/process/pressure variation, occurs in the clock signal CLK1, then the accuracy performance of captured image (s) is affected by the frequency offset and thus there is a great probability that the optical sensor device 100 may erroneously determines that a motion event frequently occurs in monitoring image(s) and then frequently sends the alarm interrupt signal to the monitoring system 200. Thus, configuring the specific communication signal as the ACK signal for one successful signal reception of the alarm interrupt signal can effectively improve the performance. The calibration method/procedure is performed by the optical sensor device 100 to determine whether to calibrate and how to calibrate the clock signal CLK1 of the oscillator circuit 105 by directly referring to the signal receptions of the ACK signal transmitted from the monitoring system 200 to the optical sensor device 100.

Further, in other embodiment, the monitoring system 200 can be arranged to send the above-mentioned acknowledgement signal or specific communication signal to the optical sensor device 100 after receiving a control signal which is different from the above-mentioned alarm interrupt signal and can be also used to make the monitoring system 200 exist the power saving mode and enter the normal operation mode. This also obeys the spirits of the invention.

Figure 3:
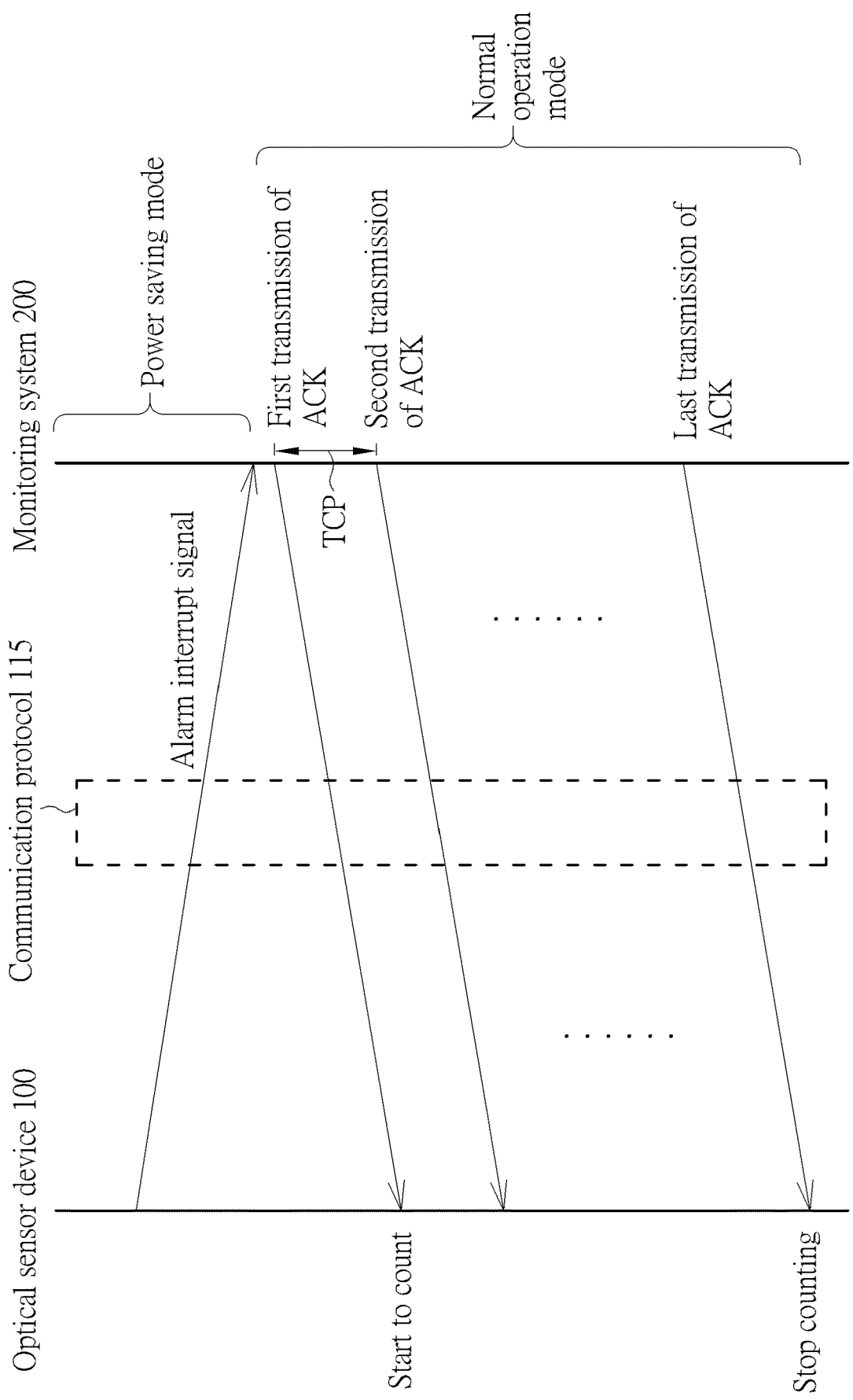
FIG. 3 is a diagram showing a scenario example of the communication between the monitoring system and the optical sensor device according to another embodiment of the invention.

In one embodiment, the specific communication signal (e.g. the ACK signal) may be transmitted by the monitoring system 200 to the optical sensor device 100 for more than two times. FIG. 3 is a diagram showing a scenario example of the communication between the monitoring system 200 and the optical sensor device 100 according to another embodiment of the invention. In FIG. 3, the monitoring system 200 initially is in the power saving mode, and it exits the power saving mode and enters the normal operation mode once receiving the alarm interrupt signal sent from the optical sensor device 100. In this example, the monitoring system 200 then is arranged to send the specific communication signal (i.e. acknowledgement (ACK) signal) for more than two times back to the optical sensor device 100, and any two successive transmission of the ACK signal is separated by the specific time cycle period TCP. The total number of the transmissions of the ACK signal can be a default setting or can be further negotiated and determined by the device 100 and system 200 in advance.

In FIG. 3, when the first transmission of the ACK signal arrives at the optical sensor device 100, the optical sensor device 100 (or processor 110) starts to count a counted number by using the actual oscillation frequency $f_{actual}$ of clock signal CLK1. When the last one transmission of the ACK signal arrives at the optical sensor device 100, the processor 110 stops the counting and obtains a resultant counted number. Then the processor 110 calculates an average counted number by dividing the resultant counted number with (M−1) wherein the value M is the total number of the transmissions of the ACK signal. The processor 110 compares the average counted number with the counter reference value $CNTR_1$ to determine whether to adjust/tune the clock signal CLK1 and determine how to adjust/tune the clock signal CLK1. An advantage of using the average counted number is that the resultantly counted number can be more precise.

Figure 4:
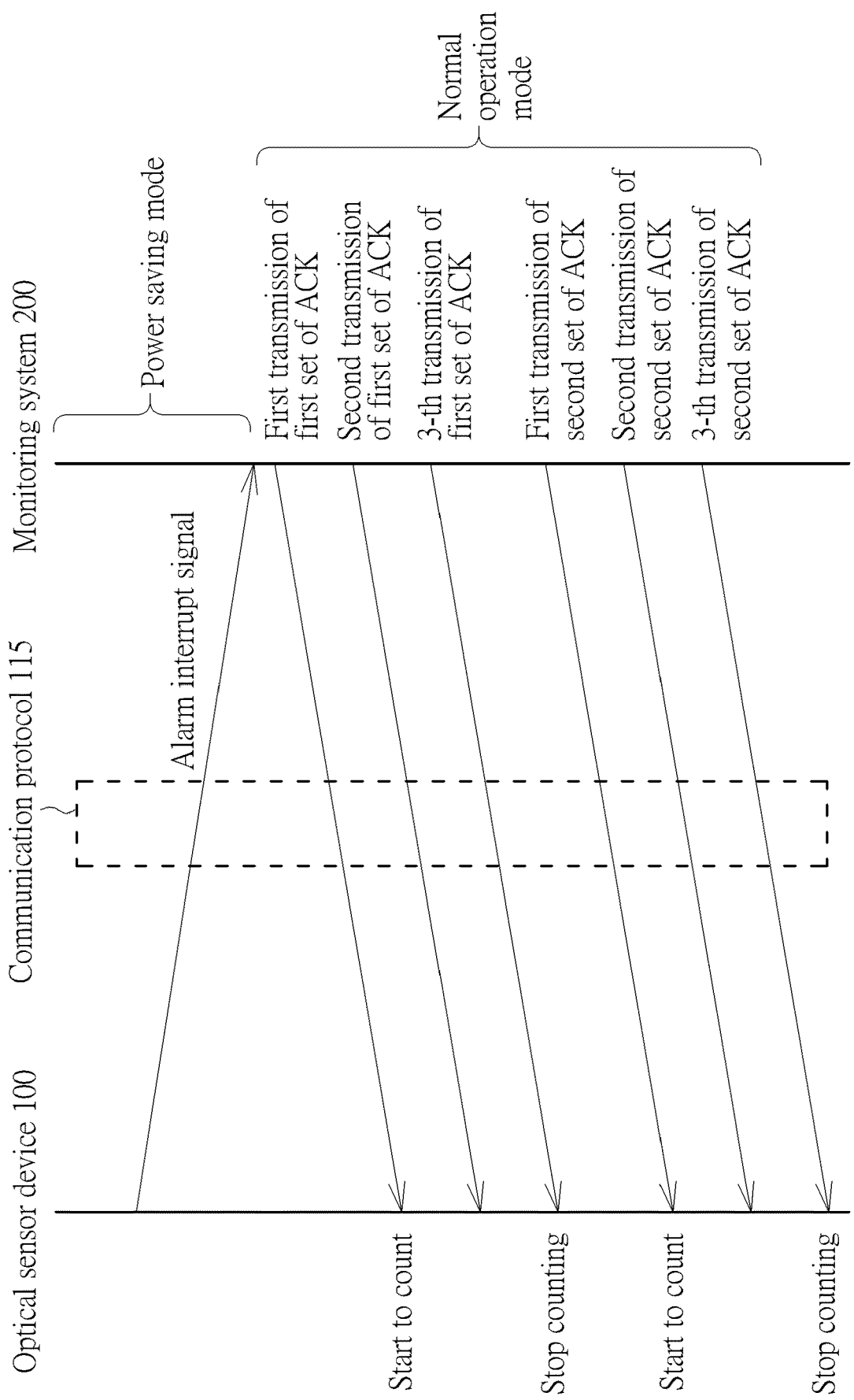
FIG. 4 is a diagram showing a scenario example of the communication between the monitoring system and the optical sensor device according to another embodiment of the invention.

In one embodiment, the optical sensor device 100 may be arranged to negotiate with the monitoring system 200 to send multiple sets of multiple transmission of the specific communication signal such as the ACK signal when the monitoring system 200 enters or is in the normal operation mode. FIG. 4 is a diagram showing a scenario example of the communication between the monitoring system 200 and the optical sensor device 100 according to another embodiment of the invention. In FIG. 4, the monitoring system 200 initially is in the power saving mode, and it exits the power saving mode and enters the normal operation mode once receiving the alarm interrupt signal sent from the optical sensor device 100. In this example, the monitoring system for example sends two sets of communication signal's transmission wherein each set comprise the transmissions of the specific communication signal such as ACK signal, and in each set any two successive transmissions of the ACK signal can be separated by the specific time cycle period TCP while two transmissions of the ACK signal in different sets may be or may be not separated by the specific time cycle period TCP. The total number of the transmissions of the ACK signal can be a default setting or can be further negotiated and determined by the device 100 and system 200 in advance.

In FIG. 4, when the first transmission of the ACK signal in the first set arrives at the optical sensor device 100, the optical sensor device 100 (or processor 110) starts to count a counted number by using the actual oscillation frequency $f_{actual}$ of clock signal CLK1. When the last one transmission of the ACK signal in the first arrives at the optical sensor device 100, the processor 110 stops the counting and obtains a first resultant counted number. Then, when the first transmission of the ACK signal in the second set arrives at the optical sensor device 100, the optical sensor device 100 (or processor 110) starts to count another counted number by using the actual oscillation frequency $f_{actual}$ of clock signal CLK1. When the last one transmission of the ACK signal in the second arrives at the optical sensor device 100, the processor 110 stops the counting and obtains a second resultant counted number. Then, the processor 110 can calculate an averaged counted number by averaging the first and second resultant counted numbers. The processor 110 compares the averaged counted number with the counter reference value $CNTR_1$ to determine whether to adjust/tune the clock signal CLK1 and determine how to adjust/tune the clock signal CLK1. An advantage of using the averaged counted number is that the resultantly counted number can be more precise.

Figure 5:
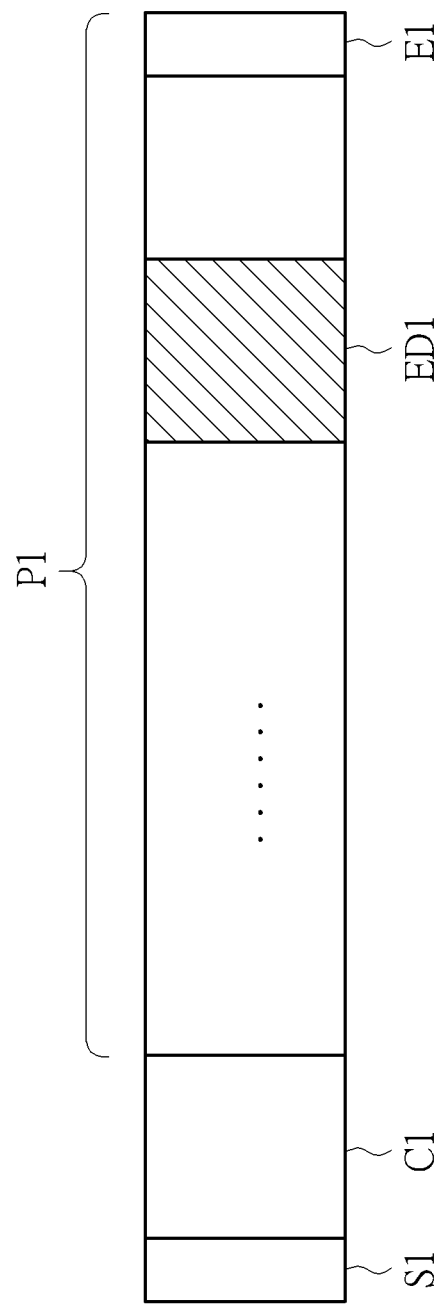
FIG. 5 is a diagram showing a specific packet signal of the ACK signal transmitted from the monitoring system to the optical sensor device according to another embodiment of the invention.

In one embodiment, the specific communication signal (e.g. the ACK signal (but not limited)) may be configured to be transmitted by the monitoring system 200 to the optical sensor device 100 for only one time. In this situation, a time length or packet length (e.g. payload sequence) of a single transmission of the ACK signal can be adjusted by the monitoring system 200 to be equal to or proportional to the specific time cycle period. The processor 110 can be arranged to start another specific counter to count another counted number by using the actual oscillation frequency $f_{actual}$ of clock signal CLK1. FIG. 5 is a diagram showing a specific packet signal of the ACK signal transmitted from the monitoring system 200 to the optical sensor device 100 according to another embodiment of the invention. In FIG. 5, the specific packet signal comprises a start portion S1, a control data portion C1, a data payload sequence portion P1, and an end portion E1, wherein the data payload sequence portion P1 may comprises an encoded data portion ED1.

For example, in one embodiment, the optical sensor device 100 (or processor 110) can start to count a specific counted number when the optical sensor device 100 receives the start S1 of the specific packet signal and the processor 110 stops the counting to obtain a resultant counted number when the optical sensor device 100 receives the end E1 of the specific packet signal; the specific counted number is incremented by one each time when a signal edge (rising edge or falling edge) of the clock signal CLK1 occurs. That is, in this embodiment, the processor 110 can be used to count the time length of the specific packet signal of ACK signal.

Alternatively, in one embodiment, the optical sensor device 100 (or processor 110) can start to count a specific counted number when the optical sensor device 100 receives a start of the data payload sequence portion P1 and the processor 110 stops the counting to obtain a resultant counted number when the optical sensor device 100 receives an end of the data payload sequence portion P1. That is, the processor 110 can be arranged to count the time length of the data payload sequence portion P1 corresponding to the ACK signal to obtain the resultant counted number so as to determine whether to and how to calibrate the frequency of clock signal CLK1. In other embodiment, the optical sensor device 100 (or processor 110) may start to count a specific counted number when the optical sensor device 100 receives a start of the encoded data portion ED1 in the data payload sequence portion P1 and the processor 110 stops the counting to obtain a resultant counted number when the optical sensor device 100 receives an end of the encoded data portion ED1 in the data payload sequence portion P1. That is, the processor 110 can be arranged to count the time length of a particular encoded data portion ED1 generated by the monitoring system 200 to obtain the resultant counted number so as to determine whether to and how to calibrate the frequency of clock signal CLK1.

It should be noted in different embodiments the obtained resultant counted numbers may be identical or may be equal to different values which are respectively associated with different designs negotiated by the monitoring system 200 and optical sensor device 100. For example, the data length(s) of the specific packet signal, the data payload sequence portion P1, and/or the encoded data portion ED1 may be configured to be associated with the specific time cycle period TCP.

Further, in one embodiment, either the optical sensor device 100 or the monitoring system 200 can be arranged to trigger the transmission(s) of the specific communication signal. For example, the operation of sending the specific communication signal for one or more times to determine whether to calibrate the clock signal CLK1 may be periodically performed by the monitoring system 200 based on the user's requirements or the operation maybe immediately triggered by the user.

In other embodiment, the specific communication signal can be configured to be different from the above-mentioned ACK signal and may be transmitted for one or multiple times after the ACK signal has been transmitted. In this situation, the calibration method/procedure is triggered in response to an event of receiving the ACK signal and is performed to determine whether to calibrate and how to calibrate the clock signal CLK1 by referring to the one or multiple transmissions of the specific communication signal without referencing the ACK signal. This modification also obeys the spirits of the invention.

Further, the control data portion C1 may further comprise an information flag which is tagged by the monitoring system 200 to indicate which one of the multiple transmissions of the specific communication signal such as the ACK signal. For example, the flag can be implemented by using one bit or more bits. For example, in FIG. 2, the first transmission and second transmission of the ACK signal can be respectively tagged with different information flags such as F1 and F2 to indicate the second transmission corresponding to the flag F2 is not a duplicate of the first transmission which may be repeatedly transmitted by the monitoring system 200 if the communication between the device 100 and the system 200 is not stable. Similarly, in FIG. 3, the more than two different transmissions of the ACK signal can be respectively tagged with different information flags.

Further, in FIG. 4, the first transmission, second transmission, and the third transmission of the ACK signal in the first set can be respectively tagged with different information flags to indicate these transmissions are belonged to the first set different from the other sets and also indicate these transmissions are slightly different to each other. Similarly, the first transmission, second transmission, and the third transmission of the ACK signal in the second set can be respectively tagged with different information flags to indicate these transmissions are belonged to the second set different from the other sets and also indicate these transmissions are slightly different to each other. Thus, for example (but not limited), a signal transmission belonging to the first set, e.g. the last signal transmission of the first set, will not erroneously determined as a signal transmission in the second set. The frequency of oscillator circuit 105 can be correctly calibrated. Equivalently, each tagged information flag can be used to indicate that a specific transmission of the specific communication signal corresponds to the n-th transmission in the m-th set.

In one embodiment, the monitoring system 200 maybe configured to have two modes wherein the monitoring system 200 in a first mode is arranged to transmit the specific communication signal for multiple times while the monitoring system 200 in a second mode is arranged to transmit the specific communication signal for only one time. The monitoring system 200 can be arranged to select the first mode or the second according to a network traffic condition of the communication protocol 115. For example, if the processor 110 determines that the communication condition is under a threshold, the processor 110 determines to use and operate in the second mode in which the clock signal CLK1 is calibrated in response to a data length of the first communication signal transmitted for only one time from the monitoring system 200 externally coupled to the optical sensor device 100 or in response to the data length of the encoded data portion of the first communication signal transmitted for only one time.

In one embodiment, when there is a low probability that a traffic congestion will occur, the monitoring system 200 in a default setting uses the first mode to transmit the specific communication signal for multiple times to the optical sensor device 100. When there is a great probability that a traffic congestion will occur or the traffic congestion has occurred, the monitoring system 200 can negotiate with the optical sensor device 100 to use the second mode to transmit the specific communication signal for only one time to the optical sensor device 100, and the optical sensor device 100 can count the time length, packet/payload length, or a particular encoded data content length of the single one transmission of the specific communication signal. This can effectively avoid the performance of the calibration method/procedure is affected by a poor network traffic condition. The above-mentioned mode selecting operation can be performed automatically or may be performed manually by the user. In addition, when the optical sensor device 100 is installed at a location or is powered on, the optical sensor device 100 can be arranged to negotiate with the monitoring system 200 to determine which of the first and second modes is used initially.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An optical sensor device, comprising:
   an oscillator circuit, for generating a clock signal; and
   a processor, coupled to the oscillator circuit, for generating monitoring frames according to the clock signal;
   wherein the clock signal is calibrated in response to at least one of: a first communication signal, transmitted for multiple times from a monitoring system externally coupled to the optical sensor device, is received by the optical sensor device; a data length of the first communication signal transmitted for only one time from the monitoring system externally coupled to the optical sensor device; and, a data length of an encoded data portion of the first communication signal transmitted for only one time.

2. The optical sensor device of claim 1, wherein the clock signal is calibrated according to a number of the transmission of the first communication signal or an interval between two transmissions of the first communication signal.

3. The optical sensor device of claim 1, wherein an interval between two transmissions of the first communication signal is equal to a specific time cycle period; the processor is arranged to use an actual frequency of the clock signal to count an interval between two receptions of the first communication signal, received by the processor, to generate a counted number; and, the processor is arranged to compare the counted number with a counter reference value to determine whether to calibrate the actual frequency of the clock signal.

4. The optical sensor device of claim 3, wherein the processor calculates an average counted number based on multiple counted numbers and compares the average counted number with the counter reference value to determine whether to calibrate the actual frequency of the clock signal.

5. The optical sensor device of claim 3, wherein the clock signal is calibrated in response to another event that a second communication signal, transmitted for multiple times from the monitoring system externally coupled to the optical sensor device, is received by the optical sensor device; a last one transmission of the first communication signal and a first one transmission of the second communication signal is separated by an interval different from the specific time cycle period.

6. The optical sensor device of claim 1, wherein the first communication signal is an acknowledgement signal sent by the monitoring system to indicate that the monitoring system exits a power saving mode and enters a normal operation mode.

7. The optical sensor device of claim 1, wherein the processor is arranged to use an actual frequency of the clock signal to count the data length of the first communication signal or the data length of the encoded data portion to generate a counted number; and, the processor is arranged to compare the counted number with a counter reference value to determine whether to calibrate the actual frequency of the clock signal.

8. An optical sensor device, comprising:
an oscillator circuit, for generating a clock signal; and
a processor, coupled to the oscillator circuit, for generating monitoring frames according to the clock signal;
wherein the clock signal is adjusted using different modes based on a network traffic condition of a communication protocol between the optical sensor device and a monitoring system externally coupled to the optical sensor device.

9. The optical sensor device of claim 8, wherein the clock signal is adjusted by using a first mode in which an actual frequency of the clock signal is calibrated in response to a signal event that a first communication signal, transmitted for multiple times from the monitoring system externally coupled to the optical sensor device, is received by the optical sensor device; and, the clock signal in the first mode is calibrated according to a number of the transmission of the first communication signal or an interval between two transmissions of the first communication signal.

10. The optical sensor device of claim 9, wherein, in the first mode, an interval between two transmissions of the first communication signal is equal to a specific time cycle period; the processor is arranged to use the actual frequency of the clock signal to count an interval between two receptions of the first communication signal, received by the processor, to generate a counted number; and, the processor is arranged to compare the counted number with a counter reference value to determine whether to calibrate the actual frequency of the clock signal.

11. The optical sensor device of claim 10, wherein the processor calculates an average counted number based on multiple counted numbers and compares the average counted number with the counter reference value to determine whether to calibrate the actual frequency of the clock signal.

12. The optical sensor device of claim 10, wherein the clock signal is calibrated in response to another event that a second communication signal, transmitted for multiple times from the monitoring system externally coupled to the optical sensor device, is received by the optical sensor device; a last one transmission of the first communication signal and a first one transmission of the second communication signal is separated by an interval different from the specific time cycle period.

13. The optical sensor device of claim 9, wherein the first communication signal is an acknowledgement signal sent by the monitoring system to indicate that the monitoring system exits a power saving mode and enters a normal operation mode.

14. The optical sensor device of claim 8, wherein the clock signal is adjusted by using a second mode in which an actual frequency of the clock signal is calibrated in response to a data length of a first communication signal transmitted for only one time from the monitoring system externally coupled to the optical sensor device or in response to a data length of an encoded data portion of the first communication signal transmitted for only one time.

15. The optical sensor device of claim 14, wherein the processor is arranged to use an actual frequency of the clock signal to count the data length of the first communication signal or the data length of the encoded data portion to generate a counted number; and, the processor is arranged to compare the counted number with a counter reference value to determine whether to calibrate the actual frequency of the clock signal.

16. The optical sensor device of claim 8, wherein the processor performs automatic switching between the first mode and the second mode according to a communication condition between the optical sensor device and the monitoring system.

17. The optical sensor device of claim 16, wherein when the processor determines that the communication condition is under a threshold, the processor determines to use and operate in the second mode in which the clock signal is calibrated in response to a data length of a first communication signal transmitted for only one time from the monitoring system externally coupled to the optical sensor device or in response to a data length of an encoded data portion of the first communication signal transmitted for only one time.

18. The optical sensor device of claim 8, wherein the processor performs a switching between the first mode and the second mode in response to an event associated with a user's manually adjustment.

19. A method of an optical sensor device, comprising:
using an oscillator circuit to generate a clock signal; and
generating monitoring frames according to the clock signal;
wherein the clock signal is calibrated in response to at least one of: a first communication signal, transmitted for multiple times from a monitoring system externally coupled to the optical sensor device, is received by the optical sensor device; a data length of the first communication signal transmitted for only one time from the monitoring system externally coupled to the optical sensor device; and, a data length of an encoded data portion of the first communication signal transmitted for only one time.

20. The method of claim 19, wherein the clock signal is calibrated according to a number of the transmission of the first communication signal or an interval between two transmissions of the first communication signal.

* * * * *